(12) United States Patent
Sailer et al.

(10) Patent No.: US 11,087,798 B2
(45) Date of Patent: Aug. 10, 2021

(54) SELECTIVE CURATION OF USER RECORDINGS

(71) Applicant: Honda Motor Co., Ltd., Tokyo (JP)

(72) Inventors: Michael T. Sailer, Whittier, CA (US); Nathan G Brown, Long Beach, CA (US); Katie C. Wallace, Long Beach, CA (US); Alen Simon, La Crescenta, CA (US); James Keen, Thousand Oaks, CA (US); Spencer L. Mackay, Agoura Hills, CA (US); Kimberlee C. Muenzer, La Canada, CA (US); Takuya Idehara, Sherman Oaks, CA (US); David K. B. Lee, Glendale, CA (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/386,047

(22) Filed: Apr. 16, 2019

(65) Prior Publication Data

US 2020/0335131 A1 Oct. 22, 2020

(51) Int. Cl.
| | |
|---|---|
| *G11B 27/031* | (2006.01) |
| *H04L 12/58* | (2006.01) |
| *G06F 16/71* | (2019.01) |
| *G06F 16/74* | (2019.01) |
| *H04N 5/77* | (2006.01) |
| *G06F 3/0482* | (2013.01) |

(52) U.S. Cl.
CPC ............ *G11B 27/031* (2013.01); *G06F 16/71* (2019.01); *G06F 16/74* (2019.01); *H04L 51/10* (2013.01); *H04L 51/32* (2013.01); *H04N 5/77* (2013.01); *G06F 3/0482* (2013.01)

(58) Field of Classification Search
CPC ....... G11B 27/031; G11B 7/188; H04L 51/10; H04L 51/32; H04N 5/77; H04N 7/12; H04N 5/2628; G06F 16/71; G06F 16/4393; G06F 3/0482; G06F 16/74
USPC .......... 386/228; 709/206; 715/202; 375/240; 348/239
See application file for complete search history.

(56) References Cited

U.S. PATENT DOCUMENTS

| | | | |
|---|---|---|---|
| 6,389,072 B1 * | 5/2002 | Tzou | H04N 19/197 348/699 |
| 7,886,333 B2 * | 2/2011 | Yamamoto | G11B 27/034 386/200 |
| 8,965,460 B1 | 2/2015 | Rao et al. | |
| 9,101,279 B2 | 8/2015 | Ritchey et al. | |
| 9,318,108 B2 | 4/2016 | Gruber et al. | |
| 9,754,243 B2 | 9/2017 | Goldsmith et al. | |
| 9,798,799 B2 | 10/2017 | Wolverton et al. | |
| 10,489,387 B1 * | 11/2019 | Rogynskyy | G06F 11/3495 |
| 10,535,372 B2 * | 1/2020 | Fisher | G01S 19/14 |
| 2001/0050875 A1 * | 12/2001 | Kahn | H04N 1/2112 365/229 |
| 2004/0216173 A1 * | 10/2004 | Horoszowski | H04N 21/6587 725/145 |

(Continued)

*Primary Examiner* — Thai Q Tran
*Assistant Examiner* — Nienru Yang
(74) *Attorney, Agent, or Firm* — American Honda Motor Co., Inc.; Aaron C. Fong

(57) ABSTRACT

The systems and methods provided herein are directed to automatically capturing, curating, and sharing recordings of a user. The automated recording and sharing features are designed to adapt to user preferences based on a history of what the user has chosen to record and share previously.

21 Claims, 6 Drawing Sheets

(56) References Cited

U.S. PATENT DOCUMENTS

| | | | |
|---|---|---|---|
| 2005/0088542 A1* | 4/2005 | Stavely | H04N 5/23222 348/239 |
| 2008/0267458 A1* | 10/2008 | Laganiere | G06K 9/00221 382/118 |
| 2013/0215289 A1* | 8/2013 | Vitsnudel | H04N 5/232 348/231.99 |
| 2014/0195626 A1* | 7/2014 | Ruff | H04W 4/14 709/206 |
| 2014/0330794 A1* | 11/2014 | Dellenbach | H04L 51/32 707/692 |
| 2015/0002681 A1* | 1/2015 | Gong | H04N 17/004 348/192 |
| 2017/0060872 A1* | 3/2017 | Sacheti | G06N 20/00 |
| 2018/0095607 A1* | 4/2018 | Proctor | G06F 3/011 |
| 2018/0203937 A1* | 7/2018 | Brodie | G06F 16/9535 |
| 2018/0316643 A1* | 11/2018 | Pesavento | G06N 3/0454 |

\* cited by examiner

SELECTIVE CURATION OF USER RECORDINGS

BACKGROUND AND BRIEF DESCRIPTION

With the advent of inexpensive recording devices and widespread social media, the curation and sharing of a user's environment and experiences has become an important activity. Typically users record their experiences using a variety of devices and contexts, then later decide which of these recordings to upload.

The present disclosure describes systems for automating both when to record material, and for curating which of these recordings to share.

In some aspects of an exemplary embodiment, a computer-implemented method includes capturing a plurality of recordings associated with a user; based on preexisting preference data associated with the user, automatically generating a selection of the plurality of recordings representing fewer than all of the captured recordings; and automatically presenting the generated selection of the recordings for sharing on a network.

In one embodiment, one or more of the plurality of recordings can be captured automatically based on detected conditions near the user and the preexisting preference data.

In one embodiment, one or more of the plurality of recordings can be captured based on instructions by the user.

In one embodiment, the preexisting preference data can include previous recordings presented by the user for sharing on the network.

In one embodiment, the recordings can include images, audio records, and/or video records.

In one embodiment, generating the selection can include automatically assigning a quality score to one or more of the recordings, and then selecting recordings having higher quality scores.

In one embodiment, the method can include automatically deleting one or more recordings of the plurality of recordings that are not in the selection.

According to aspects of an exemplary embodiment, a computer implemented method includes automatically selecting, from a plurality of user recordings, a subset of the recordings including fewer than all of the plurality of user recordings; presenting to the user the selected subset of recordings to share on a network; receiving agreement from the user to share the subset of recordings on the network; and in response to receiving agreement from the user, sharing the subset of recordings on the network.

In one embodiment, the method can include receiving editing instructions from the user, and sharing an edited subset of the recordings on the network based on the received instructions.

In one embodiment, the plurality of user recordings can represent recordings taken by a device in proximity to the user. The automatically selected subset of recordings can b selected based on an automated assessment of the quality of each of the plurality of user recordings In one embodiment, the plurality of user recordings can be recorded by a vehicle-mounted recording device. The plurality of user recordings can be recorded by a device mounted on an unmanned aerial vehicle. Alternatively, the plurality of user recordings can be recorded by a device integrated with a vehicle operated by the user.

BRIEF DESCRIPTION OF DRAWINGS

The novel features believed to be characteristic of the disclosure are set forth in the appended claims. In the descriptions that follow, like parts are marked throughout the specification and drawings with the same numerals, respectively. The drawing FIGURES are not necessarily drawn to scale and certain FIGURES can be shown in exaggerated or generalized form in the interest of clarity and conciseness. The disclosure itself, however, as well as a preferred mode of use, further objectives and advantages thereof, will be best understood by reference to the following detailed description of illustrative embodiments when read in conjunction with the accompanying drawings, wherein:

DESCRIPTION OF THE DISCLOSURE

The description set forth below in connection with the appended drawings is intended as a description of exemplary embodiments of the disclosure and is not intended to represent the only forms in which the present disclosure can be constructed and/or utilized. The description sets forth the functions and the sequence of blocks for constructing and operating the disclosure in connection with the illustrated embodiments. It is to be understood, however, that the same or equivalent functions and sequences can be accomplished by different embodiments that are also intended to be encompassed within the spirit and scope of this disclosure.

Generally described, the systems and methods herein are directed to an automated curation process for user recordings. The process uses a history of user preferences, as well as other factors, in order to select and share particular recordings from a larger selection of recordings.

Figure 1:
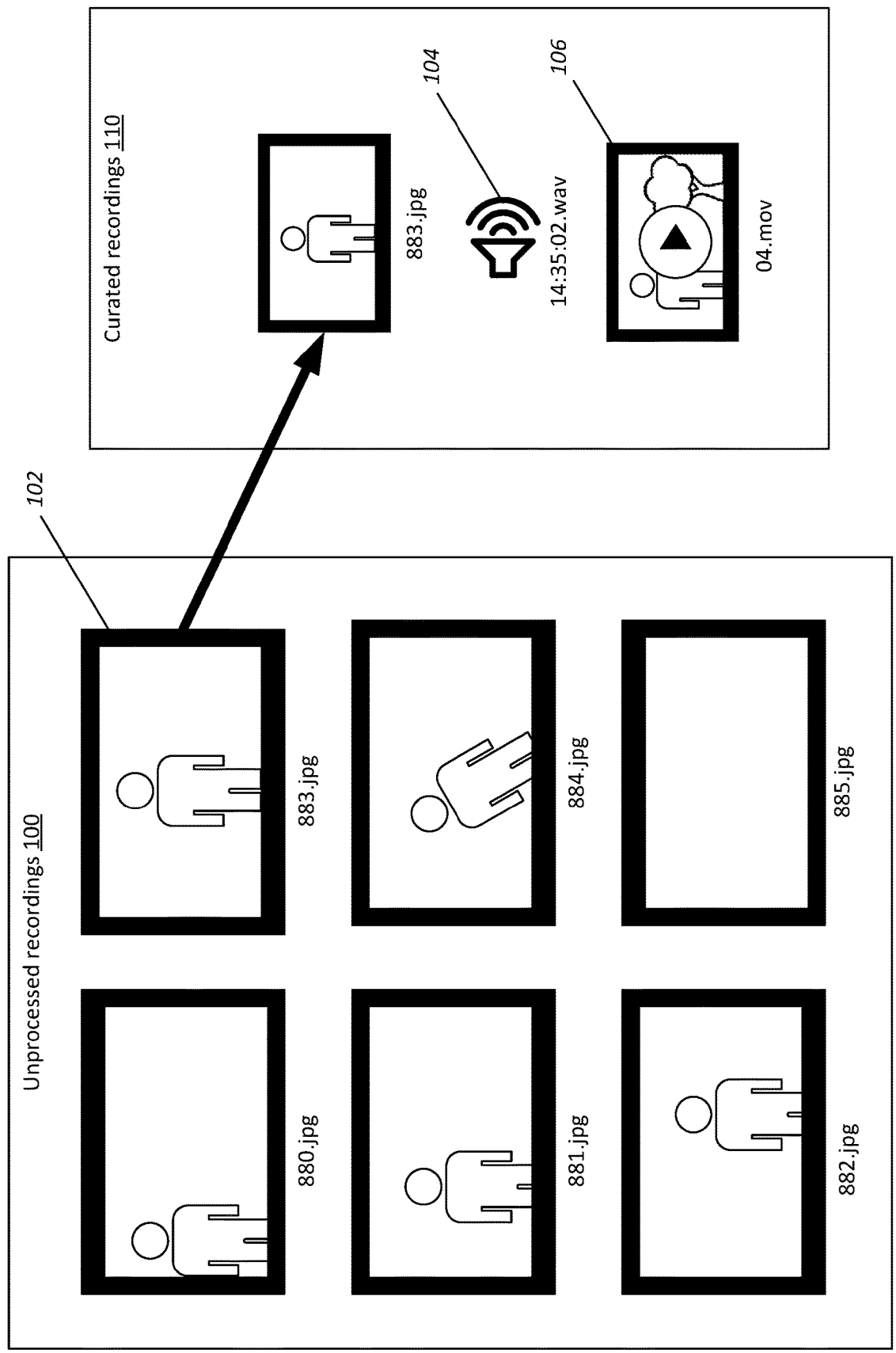
FIG. 1 is an illustration of a curation process for an image in accordance with one aspect of the present disclosure.

FIG. 1 illustrates an example of a selection of a particular recording 102 from a repository 100 of unprocessed recordings. As shown, the repository 100 includes six recordings in the jpg format, each labeled with a sequential number from 880 to 885. The particular recording 1-2, named '883.jpg,' is identified as an appropriate candidate for curation. This identification process may, for one example, involve evaluating recording against test and/or historical data to determine which have the highest quality by some metric. Among the unprocessed recordings 100, the selected image 102 is scored as having higher quality than the others because the subject is centrally located and correctly oriented within the frame. Such selections may, in some implementations, involve machine learning to compare new recordings against known high-quality recordings; such evaluative algorithms are known in the art.

The recording 102 is subsequently copied into a repository 110 from which it will be made available as further described. Each repository may include other recordings than images, such as audio recordings or full video clips (shown in FIG. 1 with the examples of an audio recording 104 a and video recording 106, respectively). Other recorded data associated with a user, such as a recording from a device display or the output of a sensory device associated with the user, may also be curated as described.

Figure 2:
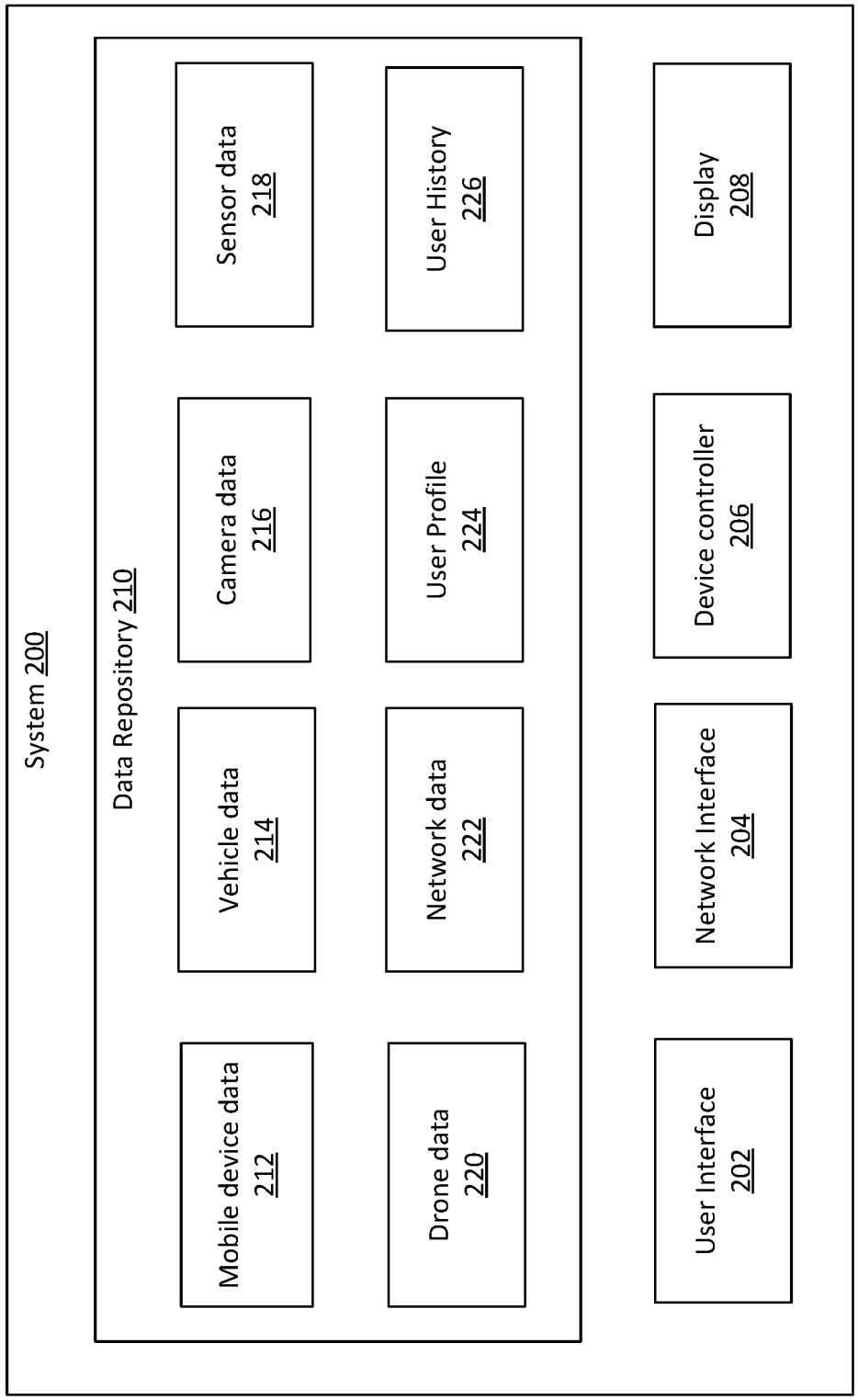
FIG. 2 is a block diagram of a curation system in accordance with one aspect of the present disclosure.

FIG. 2 illustrates software modules associated with a recording curation system 200 in accordance with some implementations of the present invention. A data repository 202 may include both data representing recordings to be curated, and ancillary data that the system 200 can use in selecting among the recordings. Additionally, the system 200 may include modules for interfacing with the user 202; for transmitting and receiving data, commands, and other signals over a network 204; for controlling the functions of one or more devices connected with the system 206; and for the output and consumption of data by the user or others 208.

The user interface module 202 may include any number of protocols for prompting a user to input instructions to the system 200. A capacitive touch surface, such as the screen of a mobile device, may serve this purpose, as might a two-way verbal interface (speaker and microphone), or a vehicle head unit. In some implementations, the user interface module 202 may mainly be understood to comprise the logic necessary to interpret the variety of potential inputs, and to send a variety of information and prompts.

The network interface module 204 allows the system 200, which may be understood to be a local or remote server and processor capable of carrying out the operations of each of the modules, to communicate with other systems and devices in order to request and receive data as needed. Wired and wireless interfaces may connect the system with any number of flexible communication protocols, such as that used over the Internet. Where elements of the system 200 are hosted remotely from a user and the user's devices, the network interface 204 can be a requirement for the system 200 to actively operate as described herein. Some implementations may include the capacity to operate "offline" for varying periods and with differing degrees of functionality.

The device controller module 206, which may be multiple separate modules in some implementations, facilitates the control of user devices by means of the system 200. The system 200 may, as further described herein, control when and how recordings are taken, as well as other functions relevant to the user's activity (such as navigation for a drone or vehicle, setting adjustments for a user's appliance or device, or automatically connecting the user with a business or individual).

The display module 208 can facilitate the display of data, media, recordings, or anything else within the capabilities of the system 200 as configured. As used herein, the term "display" broadly means output in a way observable by individuals, which may include audio output or haptic feedback instead of (or in addition to) a visual display. The display module 200 may, in some implementations, allow the user to hear music, to feel vibrations as part of a virtual scenario, to review curated media, or to preview a travel destination.

Curation of recordings will, in some implementations, involve data from a variety of sources. The system's data repository 210 may include a number of different sources of data, each providing the basis for one or more factors used in the curation process.

It will be recognized that not all implementations of a curation system 200 will involve the use of data from each of these sources. Furthermore, implementations of the system can take into account that, even when a particular source of data is allowed for in the repository 210, that particular data may not be available or relevant. Default settings for certain curation processes may take this into account; also, 'training' data or other default data may be made available to systems where particular data sources are unpopulated.

Additionally, one of ordinary skill will recognize that the data sources described below may include data elements that overlap multiple categories. The data in the repository 210 is not necessarily categorized in accordance with the sources 212-226, but may be instead categorized according to data type or the data's role in optimizing the curation process.

Mobile device data 212 includes data collected or received by the user's mobile device. Images, audio and video recordings, telemetry, application settings and metadata, and other information relevant to the user can be found on the user's mobile device. In some embodiments, much of the logic of the system 200 may be found on the mobile device as well, which may through an application provide some or all of the curation processes described herein.

Vehicle data 214 includes data collected or received from a passenger vehicle. A vehicle may include a conventional on-road vehicle (such as a motorcycle or automobile), an off-road vehicle (such as an ATV or dirt bike), a passenger vehicle (such as a train or bus), an aerial or nautical vehicle, or any other mode of transportation able to receive and transmit data. Vehicles can include cameras and microphones built into the interior of the vehicle, the exterior, or both. Pressure, temperature, GPS, and other sensors can also be included in the vehicle; such sensor data is often used for vehicle operations. User behavior in interacting with the vehicle, such as requesting navigation or contact information for particular locations or businesses, can also be included in the repository 210 and used by the system 200.

Camera data 216 includes data collected by a standalone recording device, such as a handheld camera. A variety of features may be available as part of the functionality of the camera, such as image processing and sorting. Some of these features may be used by the system 200 as part of, or complementary to, the curation process.

Sensor data 218 includes data other than recordings that may nonetheless be used in the curation process, and in some cases may even be posted in addition to or as part of the curated recordings. Sensors may record such qualities as position, velocity, acceleration, temperature, luminosity, humidity, weight, size, distance, albedo, flexibility, signal strength, sound intensity, and anything else that can be detected or measured. Sensors can be standalone or may be integrated with other devices.

Drone data 220 includes data associated with a mobile unmanned aerial vehicle, which in some implementations may be used to take recordings. A drone may be equipped with the ability to take sound, images, or video. Drones may also have internal telemetry and other sensors. In some implementations, drone data can also include user commands or control signals to the drone, which may be used to determine which recordings may be more important to the user.

Network data 222 includes data received from devices and servers not belonging to the user. In some implementations, this may include recordings taken by other users or by third party devices, which may be used to curate recordings or even included with curated recordings when permitted.

A user profile 224 is data regarding the user for which recordings are being curated. Much of this information may be supplied and maintained by the user, but a user profile may further include data received from other applications and services that the user provides the system 200 with access to. The user profile 224 may include elements of the user history 226, which is a record of the past actions and selections taken by the user.

A particularly relevant element of user history 226 are actions taken by the user in response to past curation events. In some implementations, a user may be notified each time that the system 200 selects and curates one or more recordings for sharing online. The user is then invited to approve of the curation, to reject it (which may remove the recordings from being shared), or modify the curated selections. Such actions by the user provides the system 200 with direct feedback as to whether its curation process match's the user's preferences, and may be used iteratively to improve the quality of future curations.

Interests and aspirations expressed by the user may also be taken into account as part of the user profile 224 and/or user history 226. For example, if a user has expressed a desire to engage in particular activity or visit a particular location, the system may choose to generate and/or curate recordings relevant to the desired future activity or destination.

Figure 3A:
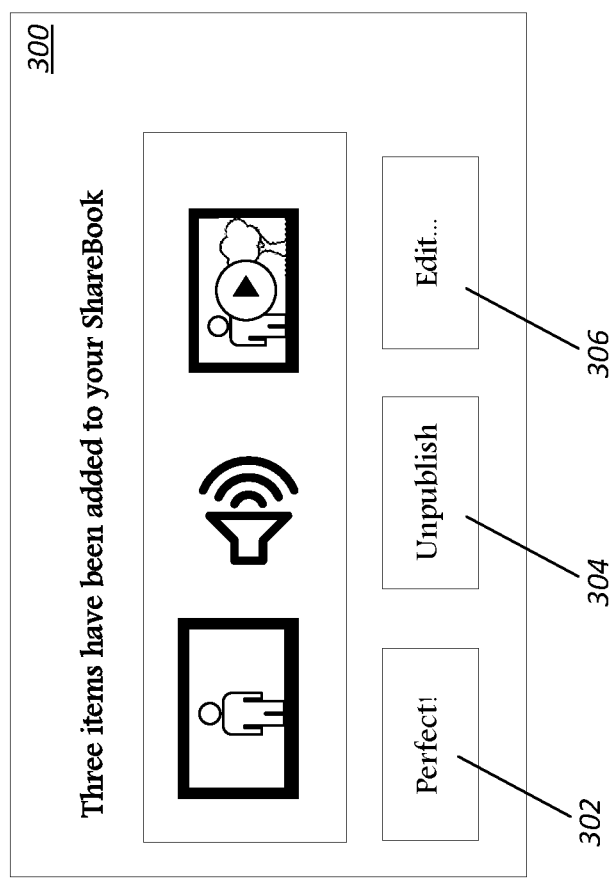
FIG. 3A is an illustrated screenshot of a user notification in accordance with one aspect of the present disclosure.

FIG. 3A illustrates a notification 300 provided to a user when recordings are curated and added to a social media sharing site. The user can respond, either by approving the curated items (button 302), canceling their publication (button 304), or editing the curation, which gives the user the opportunity to adjust particular recordings and potentially add additional recordings to the group (button 306). In some implementations, the user may have the option to adjust settings such that curated items like those shown in FIG. 3A are either automatically uploaded for sharing when curated, or are instead kept private to the user until the user explicitly approves the curation.

Figure 3B:
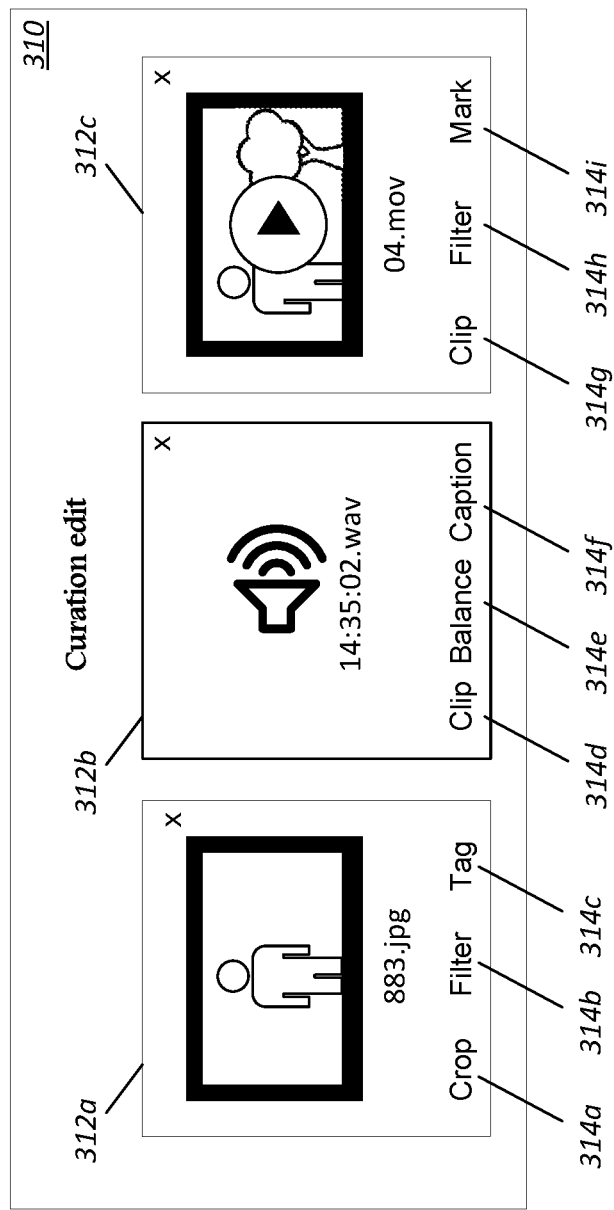
FIG. 3B is an illustrated screenshot of curation editing menu in accordance with one aspect of the present disclosure.

FIG. 3B. illustrates a curation edit window 310 displayed in response to the user selecting an option to edit, such as the button 306 from FIG. 3A. The curation edit window 310 may include a plurality of edit menus 312a-c, each associated with a different recording. In some implementations, an edit menu 312 may appear when a user selects a particular file; menus may also appear in some embodiments when a particular icon is rolled over by a pointer or otherwise made the focus of the screen.

As shown in FIG. 3B, each different edit menu 312 may include different editing options based on the type of recording. The edit menu 312a associated with an image file is shown having the options to crop the image (314a), apply a visual filter to the image (314b), or tag one or more individuals in the image (314c). The edit menu 312b associated with an audio file is shown having the options to excerpt a shorter audio clip (314d), adjust the balance of the audio playback (314e), or add captioning to particular time windows of the recording (3140. The edit menu 312c associated with a video file is shown having the options to excerpt a shorter clip (314g), apply one or more audio or visual filters to the recording (314h), or create marks at particular time stamps within the video (314i). The system may, in some implementations, contextually select which editing options are made immediately available to the user based on the user's past and predicted editing preferences. Other options than those immediately available on an editing display may, in some implementations, be available by accessing additional menus.

Figure 4:
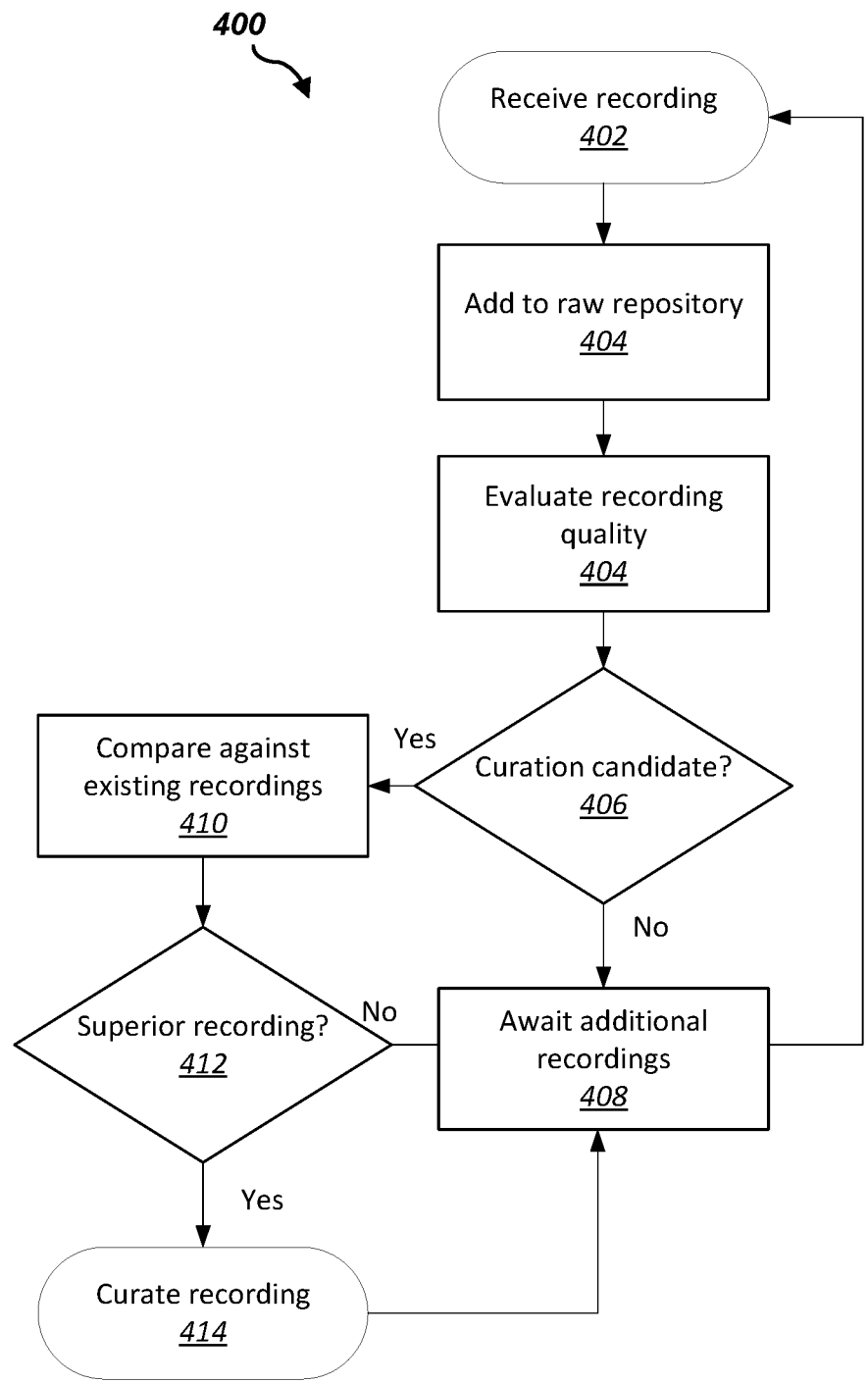
FIG. 4 is a flowchart of a curation process in accordance with one aspect of the present disclosure.

FIG. 4 is a flowchart 400 describing the processing of recordings as they are made by a curation system. In some implementations, a curation process may occur each time that a recording is received by the system (step 402). Alternatively, the subsequent steps may be performed only periodically, in response to multiple recordings being received or after an appropriate interval. This decision may be user-selected or may be based on the user's history; for instance, the system may recognize from the user's history that after taking a first image showing a pet, they tend to take several further images of the pet before selecting one or more to upload. Thus, when the system recognizes a first image as being of a pet, the system may delay undergoing to curation process until an opportunity to include further pet images in the repository has lapsed.

Before curating the recording, it may be added to a raw repository (step 404). This repository may be of limited size based on the storage capacity accessible to the system. In some implementations, the repository may only keep recordings that are not curated, or alternatively may keep all recordings until the user clears them, or until the space is filled and older recordings must be cleared to make way for newer ones.

The system may then evaluate the quality of the recording (step 404), which may include any of a variety of factors. In some implementations, quality may be based around machine learning, matching aspects of the recording against metrics developed from trained data and user history. Recordings that have elements common to previously kept recordings are judged higher quality than recordings which match those previously discarded. Other rubrics may also be used for evaluating quality. For example, an image that the system successfully resolves into faces and/or objects may be valued over one where the system cannot resolve these features. Central positioning, sharp in-focus lines, and even such items as whether figures in an image are smiling may all be used to evaluate quality. Similarly, low background noise, or the ability to easily resolve speech or other sound, may be used as an indicator of a recording's audio quality.

Recordings not considered to be candidates for curation, due to their poor quality or other factors, may then sit in the raw repository while the system awaits additional recordings (step 408). Alternatively, a recording that is considered a candidate for curation is then evaluated against other recordings (step 410). In some implementations, the system may limit the number of recordings curated based on time, location, or subject; for instance, when a user takes several pictures of their pet during a five-minute window, at most two of these images are curated and shared. The system therefore selects superior recordings for curation (steps 412 and 414). All other recordings are not curated, and the system continues to await additional recordings to be taken.

Figure 5:
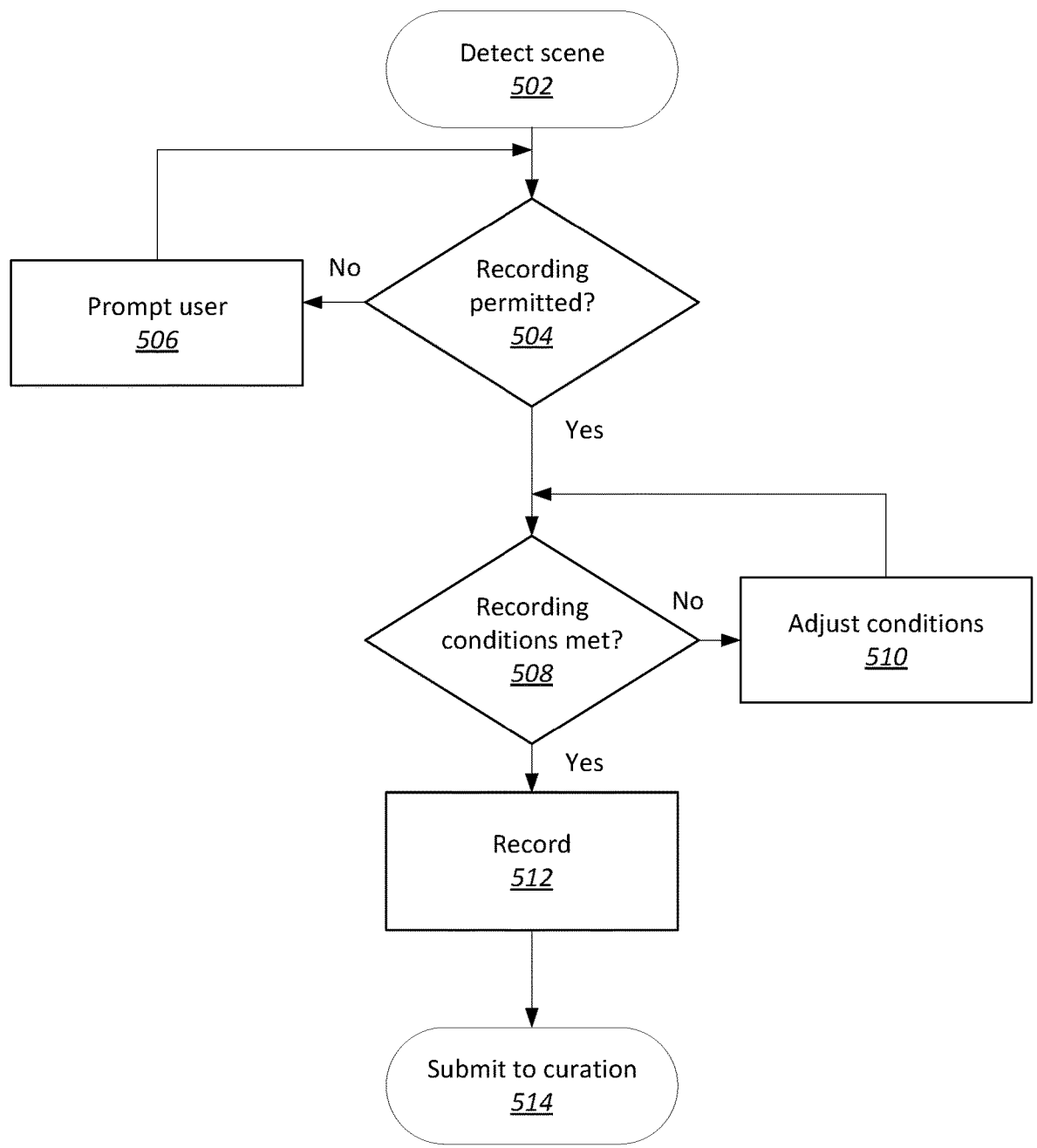
FIG. 5 is a flowchart of an automated recording process in accordance with one aspect of the present disclosure.

In addition to receiving and curating recordings, in some implementations, the system may also automatically instruct one or more devices to take recordings. An exemplary process for this is described in the flowchart 500 of FIG. 5.

The system detects a scene to record (step 502). This scene detection may happen in a number of ways. For example, a camera in proximity to the user may recognize audiovisual conditions similar to conditions where the user has chosen to record in the past (using the user's own history of recordings as a machine learning data set against which the present conditions are candidate data). Other factors may include the user's location, events noted on the user's calendar (especially those with names suggestive of recording, like "sightseeing" or "daytrip"), the user's behavior (such as the user directing their gaze at a particular scene for a noticeable period of time), or a comparison with other users (such as if a detected scene matches something that many other users have shared recordings of, or are currently recording.)

In some implementations, the system may explicitly check against a user's settings for automated recording before proceeding. For example, some users may specify that the system should only begin recording in a public place and not in a private residence, or specifically not in the user's home or office. More particular location restrictions (record only in the sitting room or kitchen, not in the bedroom or bathroom) or other restrictions (never record when unidentified persons are in the frame; never record when the system recognizes particular objects, activities, or conditions) may also be in place.

In some implementations, upon determining that automated recording is not permitted under the restrictions, the system may nonetheless prompt the user to record (step 506). This may allow the user to override the restrictions and allow the system to proceed with an automated recording, or in some implementations, may instead proceed with whatever protocols a system uses for recording according to a user's instructions to do so.

When the system is permitted to record, it may then detect to see if the conditions are proper to generate an acceptable recording (step 508). For example, if the lighting is poor, or the camera is pointed at a bad angle to observe the scene, then conditions may need to be adjusted (step 510). This may include adjusting device settings (such as focusing a lens), adjusting a device location (such as moving a drone into position), adjusting persons in or near the scene (such as sending a prompt for a user or another individual to reposition themselves), or signaling one or more other systems to make adjustments (such as communicating with a smart house to adjust light levels or open a door).

The system then records for however long the scene and conditions call for (step 512). The system can stop recording when instructed to stop by the user, when conditions are no longer met for recording, when a duration determined by a user's preferences and history is reached, or when an event or phenomenon associated with the recording is determined to have ended (such as a whale no longer being visible, or a geyser eruption having finished).

Once the recording is completed, it may be submitted to curation (step 514) as described herein. Alternatively, an automated recording may in some implementations already be considered to have been curated in accordance with the standards required for the choice to automatically record, and may therefore be shared as a curated recording.

The data structures and code, in which the present disclosure can be implemented, can typically be stored on a non-transitory computer-readable storage medium. The storage can be any device or medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the disclosure can be embodied as code and/or data, which can be stored in a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium. Furthermore, the methods and processes described can be included in hardware components. For example, the hardware components can include, but are not limited to, application-specific integrated circuit (ASIC) chips, field-programmable gate arrays (FPGAs), and other programmable-logic devices now known or later developed. When the hardware components are activated, the hardware components perform the methods and processes included within the hardware components.

The technology described herein can be implemented as logical operations and/or components. The logical operations can be implemented as a sequence of processor-implemented executed blocks and as interconnected machine or circuit components. Likewise, the descriptions of various components can be provided in terms of operations executed or effected by the components. The resulting implementation is a matter of choice, dependent on the performance requirements of the underlying system implementing the described technology. Accordingly, the logical operations making up the embodiment of the technology described herein are referred to variously as operations, blocks, objects, or components. It should be understood that logical operations can be performed in any order, unless explicitly claimed otherwise or a specific order is inherently necessitated by the claim language.

Various embodiments of the present disclosure can be programmed using an object-oriented programming language, such as SmallTalk, Java, C++, Ada or C#. Other object-oriented programming languages can also be used. Alternatively, functional, scripting, and/or logical programming languages can be used. Various aspects of this disclosure can be implemented in a non-programmed environment, for example, documents created in HTML, XML, or other format that, when viewed in a window of a browser program, render aspects of a GUI or perform other functions. Various aspects of the disclosure can be implemented as programmed or non-programmed elements, or any combination thereof.

The foregoing description is provided to enable any person skilled in the relevant art to practice the various embodiments described herein. Various modifications to these embodiments will be readily apparent to those skilled in the relevant art, and generic principles defined herein can be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more." All structural and functional equivalents to the elements of the various embodiments described throughout this disclosure that are known or later come to be known to those of ordinary skill in the relevant art are expressly incorporated herein by reference and intended to be encompassed by the claims. Moreover, nothing disclosed herein is intended to be dedicated to the public regardless of whether such disclosure is explicitly recited in the claims.

What is claimed is:

1. A computer-implemented method, comprising:
   in a system comprising a memory that stores previously captured high-quality recordings:
   capturing a first recording of a plurality of recordings that includes at least one of images, audio records, or videos associated with a user;
   setting a predetermined time interval for capturing the plurality of recordings including a second recording based on a subject of the captured first recording and a user history associated with the subject;
   comparing a quality of the second recording with a quality of one of the first recording or the previously captured high-quality recordings;
   assigning a quality score to each of the captured plurality of recordings based on the comparison;

automatically generating a selection of a subset of recordings of the plurality of recordings based on the assigned quality score after the set predetermined time interval is lapsed, wherein a number of the subset of recordings is based on at least one of the subject of the captured plurality of recordings or a location associated with the captured plurality of recordings; and automatically presenting the generated selection of the subset of recordings for sharing on a network.

2. The computer-implemented method of claim 1, further comprising:

detecting a plurality of conditions near the user; and controlling start or stop of capturing of the plurality of recordings automatically based on at least one of:

a similarity between the detected plurality of conditions near the user and a predetermined condition, wherein the predetermined condition comprises information of conditions where the user has chosen to record in the past and a detected gaze of the user for a period of time.

3. The computer-implemented method of claim 1, wherein one or more of the plurality of recordings are captured based on instructions by the user.

4. The computer-implemented method of claim 1, wherein the previously captured high-quality recordings includes previous recordings presented by the user for sharing on the network.

5. The computer-implemented method of claim 1, wherein the subset of recordings has higher quality scores among the plurality of recordings.

6. The computer-implemented method of claim 1, further comprising:

receiving ancillary data from a plurality of data sources, wherein the ancillary data includes at least one of mobile device data, vehicle data, camera data, sensor data, network data; and automatically generating the selection of the subset of recordings of the plurality of recordings based on the received ancillary data.

7. The computer-implemented method of claim 1, further comprising:

detecting a plurality of conditions near the user;

adjusting the plurality of conditions by communicating with an external device; and controlling the capturing of the plurality of recordings based on the adjusted plurality of conditions.

8. The computer-implemented method of claim 1, further comprising:

determining an event for the capture of the plurality of recordings; and stopping the capture of the plurality of recordings based on a determination that the event has ended.

9. The computer-implemented method of claim 1, further comprising:

receiving a user input to approve or modify the generated selection of the subset of recordings; and recording the user input as a user preference for subsequent generation of the subset of recordings.

10. The computer-implemented method of claim 1, further comprising:

receiving a user input associated with at least one restriction for automatically capturing the plurality of recordings; and capturing the plurality of recordings based on the at least one restriction, wherein the at least one restriction includes at least one of a restriction related to capture of a location, a restriction related to capture of an object, or a restriction related to capture of an activity.

11. A computer-implemented method, comprising:

in a system comprising a memory that stores previously captured high-quality recordings:

receiving a first recording of a plurality of recordings that includes images, audio records, or videos associated with a user;

setting a predetermined time interval for capturing the plurality of recordings including a second recording based on a subject of the received first recording and a user history associated with the subject;

receiving the plurality of recordings including the second recording;

comparing a quality of the second recording with a quality of one of the first recording or the previously captured high-quality recordings;

assigning a quality score to each of the received plurality of recordings based on the comparison;

automatically selecting, from the received plurality of recordings, a subset of recordings based on the assigned quality score after the set predetermined time interval is lapsed, wherein a number of the subset of recordings is based on at least one of the subject of the received plurality of recordings or a location associated with the received plurality of recordings;

presenting to the user the selected subset of recordings to share on a network;

receiving agreement from the user to share the subset of recordings on the network; and in response to receiving the agreement from the user, sharing the subset of recordings on the network.

12. The computer-implemented method of claim 11, further comprising:

receiving editing instructions from the user;

displaying a curation edit menu, having determined edit options, based on a type of the subset of recordings and predicted editing preferences associated with the user in response to the received editing instructions, wherein the type of the subset of recordings includes an image, an audio file, or a video file;

editing the subset of recordings based on the determined edit options; and sharing the edited subset of recordings on the network.

13. The computer-implemented method of claim 11, wherein the plurality of recordings are acquired from a device in proximity to the user.

14. The computer-implemented method of claim 11, wherein the plurality of recordings are recorded by a vehicle-mounted recording device.

15. The computer-implemented method of claim 14, wherein the plurality of recordings are recorded by a device mounted on an unmanned aerial vehicle.

16. The computer-implemented method of claim 14, wherein the plurality of recordings are recorded by a device integrated with vehicle operated by the user.

17. A computing system, comprising:

an input device;

an output device;

at least one processor; and a memory that stores previously captured high-quality recordings, wherein the memory further stores program instructions that when executed by the at least one processor, causes the at least one processor to:

generate a first recording of a plurality of recordings that includes at least one of images, audio records, or videos associated with a user;

set a predetermined time interval for generation of the plurality of recordings including a second recording based on a subject of the generated first recording and a user history associated with the subject;

compare a quality of the second recording with a quality of one of the first recording or the previously captured high-quality recordings;

assign a quality score to each of the plurality of recordings based on the comparison;

automatically select, from the plurality of recordings, a subset of recordings based on the assigned quality score after the set predetermined time interval is lapsed, wherein a number of the subset of recordings is based on at least one of the subject of the plurality of recordings or a location associated with the plurality of recordings;

present to the user the selected subset of recordings to share on a network through the output device;

receive agreement from the user to share the subset of recordings on the network through the input device; and in response to receiving the agreement from the user, share the subset of recordings on the network.

18. The computing system of claim 17, wherein the program instructions that when executed by the at least one processor, causes the at least one processor to:

determine whether the user is centrally located in the subset of recordings of the plurality of recordings;

assign a higher quality score to the subset of recordings among the plurality of recordings based on the determination that the user is centrally located; and select the subset of recordings based on the assigned higher quality score.

19. The computing system of claim 17, wherein the program instructions that when executed by the at least one processor, causes the at least one processor to:

assign a higher quality score to the subset of recordings among the plurality of recordings based on an orientation of the user in the plurality of recordings; and select the subset of recordings based on the assigned higher quality score.

20. The computing system of claim 17, wherein the program instructions that when executed by the at least one processor, causes the at least one processor to generate the plurality of recordings associated with the user based on a user profile, and the user profile comprises a particular activity, the location, or the user history.

21. The computing system of claim 17, wherein the program instructions that when executed by the at least one processor, causes the at least one processor to:

detect a plurality of conditions near the user; and generate the plurality of recordings based on the detected plurality of conditions.

* * * * *